United States Patent
Miki et al.

(10) Patent No.: US 8,686,989 B2
(45) Date of Patent: Apr. 1, 2014

(54) LIQUID CRYSTAL SHUTTER, DRIVING METHOD OF THE SAME AND IMAGE DISPLAY SYSTEM

(75) Inventors: Hirohisa Miki, Ishikawa-ken (JP); Shigesumi Araki, Ishikawa-ken (JP); Kazuhiro Nishiyama, Ishikawa-ken (JP); Tetsuya Kojima, Ishikawa-ken (JP); Kenji Nakao, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 398 days.

(21) Appl. No.: 13/074,507

(22) Filed: Mar. 29, 2011

(65) Prior Publication Data

US 2011/0242089 A1 Oct. 6, 2011

(30) Foreign Application Priority Data

Mar. 31, 2010 (JP) ................................ 2010-084063

(51) Int. Cl.
*G09G 5/00* (2006.01)

(52) U.S. Cl.
USPC .............................. 345/214; 345/87; 349/13

(58) Field of Classification Search
USPC .......... 345/7–9, 204, 214, 87; 348/56; 349/13
See application file for complete search history.

(56) References Cited

U.S. PATENT DOCUMENTS

| | | | | |
|---|---|---|---|---|
| 4,870,600 A | * | 9/1989 | Hiraoka | 345/419 |
| 6,069,620 A | * | 5/2000 | Nakamura et al. | 345/214 |
| 6,671,009 B1 | * | 12/2003 | Hattori et al. | 349/33 |
| 6,909,412 B2 | * | 6/2005 | Son | 345/87 |
| 6,950,172 B2 | * | 9/2005 | Hattori et al. | 349/191 |
| 7,202,849 B2 | * | 4/2007 | Hattori et al. | 345/99 |
| 7,483,007 B2 | * | 1/2009 | Chen et al. | 345/87 |
| 7,714,819 B2 | * | 5/2010 | Kawaguchi et al. | 345/87 |
| 2008/0129899 A1 | * | 6/2008 | Sharp | 349/13 |
| 2011/0141382 A1 | * | 6/2011 | Okita et al. | 349/13 |

FOREIGN PATENT DOCUMENTS

JP 2007-110683 4/2007

OTHER PUBLICATIONS

U.S. Appl. No. 12/965,237, filed Dec. 10, 2010, Mitsutaka Okita et al.

* cited by examiner

*Primary Examiner* — Tom Sheng
(74) *Attorney, Agent, or Firm* — Oblon, Spivak, McClelland, Maier & Neustadt, L.L.P.

(57) ABSTRACT

In one embodiment, the liquid crystal shutter is equipped with a first liquid crystal panel in the OCB mode to control the transmissivity of the light entering into left eye and a second liquid crystal panel in the OCB mode to control the transmissivity of the light entering into right eye, and a drive portion to control the transmissivity. The drive portion applies a normal voltage of a normal drive in a pulse shape and a retention voltage having a pulse shape with lower frequency than the normal voltage or lower voltage than normal voltage to the first liquid crystal panel and the second liquid crystal panel. The drive portion switches between the normal drive and the retention drive while maintaining bend alignment state.

16 Claims, 13 Drawing Sheets

LIQUID CRYSTAL SHUTTER, DRIVING METHOD OF THE SAME AND IMAGE DISPLAY SYSTEM

CROSS-REFERENCE TO RELATED APPLICATION

This application is based upon and claims the benefit of priority from Japanese Patent Application No. 2010-084063, filed Mar. 31, 2010, the entire contents of which are incorporated herein by reference.

FIELD

This invention relates to a liquid crystal shutter, a driving method of the same and an image display system.

BACKGROUND

In recent years, various technologies for displaying a three-dimensional image are proposed. As the above-mentioned technology, the three-dimensional image display technology, for example, using a liquid crystal shutter of an active shutter type and display devices such as a liquid crystal display device etc. of a time sharing type is known (for example, refer to Japanese Laid Open Patent Applications (1) to (3)).

Japanese Laid Open Patent Applications No. H10-191399 (1)

Japanese Laid Open Patent Applications No. 2000-275575 (2)

Japanese Laid Open Patent Applications No. 2007-110683 (3)

The liquid crystal display device displays the image for left eye and the image for right eye by turns. The liquid crystal shutter switches a liquid crystal panel for right eye and a liquid crystal panel for left eye to a transmissive state (ON) or a non-transmissive state (OFF) corresponding to the displayed images in the liquid crystal display device.

While the liquid crystal display device displays the image for left eye, the light emitted from the liquid crystal display device penetrates the liquid crystal panel for left eye, and is shut in the liquid crystal panel for right eye. Similarly, while the liquid crystal display device displays the image for right eye, the light emitted from the liquid crystal display device penetrates the liquid crystal panel for right eye, and is shut in the liquid crystal panel for left eye.

Thereby, the user wearing the liquid crystal shutter watches the image for right eye and the image for left eye by turns by right and left eyes, and the two-dimensional images displayed on the liquid crystal display can be perceived as a three-dimensional image. In this case, the liquid crystal shutter conducts a normal drive in synchronism with the image displayed by the liquid crystal display device based on the synchronization signal transmitted from the liquid crystal display device.

By the way, when the synchronization signal which a liquid crystal shutter receives stops according to a certain obstacle, if a sight line of the liquid crystal shutter user moves to other portion than the liquid crystal display, an interferential action arises between other light sources and the liquid crystal shutter. Therefore, the liquid crystal shutter user becomes unpleasant. Moreover, since high frequency driving of 120 Hz is performed in the normal drive and power consumption is large, the normal drive is unnecessary except viewing the three-dimensional image.

Moreover, since high-speed response is required for the liquid crystal shutter, it is desirable to use OCB (Optically Compensated Bend) liquid crystal for the liquid crystal shutter. However, in case of using the OCB liquid crystal, since the liquid crystal is in a splay alignment state in an initial stage, it is necessary to operate the liquid crystal after making the liquid crystal transit to a bend alignment state in the initial stage by applying a predetermined voltage. Moreover, if the predetermined voltage is not impressed to the OCB liquid crystal for a certain period, the OCB liquid crystal has character that the OCB liquid crystal reverse-transits from the bend alignment state to the splay alignment state. For this reason, when a power supply is turned off at the time of non-use of the liquid crystal shutter or the synchronization signal fails for a short-time, the OCB liquid crystal reverse-transits to the initial alignment state, that is, the splay alignment state. Accordingly, it is necessary to make the OCB liquid crystal transit to the bend alignment state from the splay alignment state again for continuous use, and further, there is a possibility that stability may be missing on that operation.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
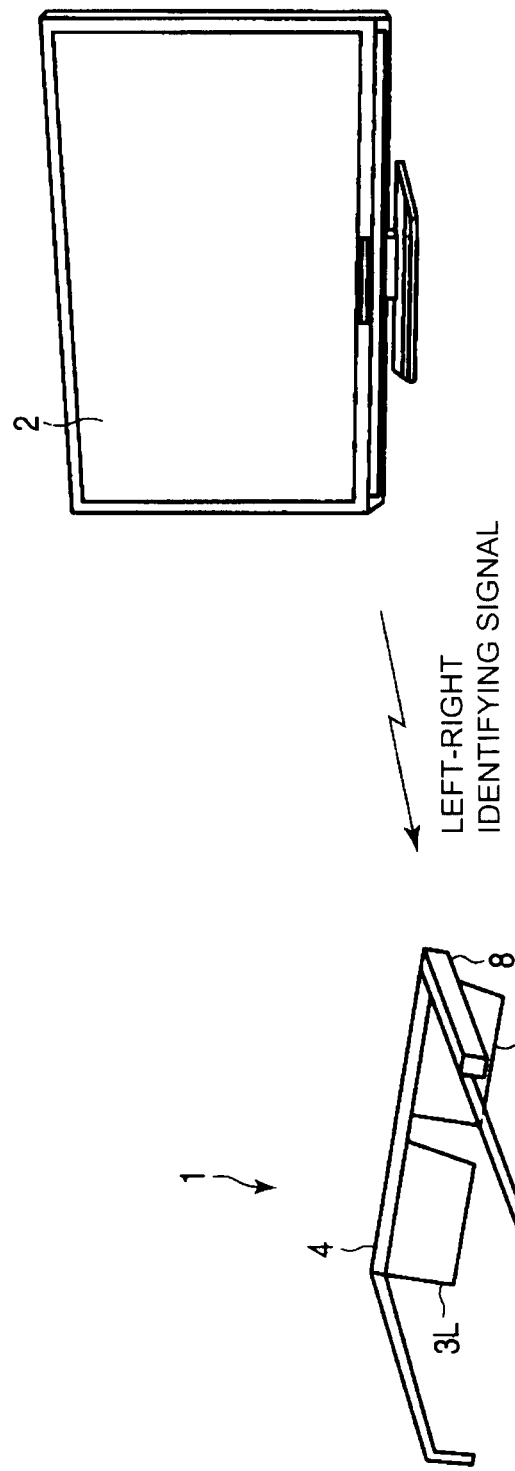
FIG. 1 is a figure schematically showing an image display system according to one embodiment of the present invention.

A liquid crystal shutter, a driving method of the same and an image display system according to an exemplary embodiment of the present invention will now be described with reference to the accompanying drawings wherein the same or like reference numerals designate the same or corresponding portions throughout the several views.

According to one embodiment, a liquid crystal shutter includes: a first liquid crystal panel having a pair of electrode substrates and liquid crystal layer held between the electrode substrates and covering left eye, the first liquid crystal panel being driven by the OCB mode capable of controlling transmissivity of light entering into left eye; a second liquid crystal panel having a pair of electrode substrates and liquid crystal layer held between the electrode substrates and covering right eye, the second liquid crystal panel being driven by the OCB mode capable of controlling transmissivity of light entering into right eye; and a drive portion to switch a normal drive and a retention drive of the first and second liquid crystal panels; wherein the normal drive switches the first and second liquid crystal panels between a transmissive state and a non-transmissive state respectively by applying a normal voltage in a pulse shape while the first and second liquid crystal panels are set in a bend alignment state, and the retention drive applies a retention voltage in a pulse shape having lower frequency than the normal voltage or lower voltage than the normal voltage to the first and second liquid crystal panels to maintain bend alignment.

According to other embodiment, a driving method of a liquid crystal shutter includes a first liquid crystal panel having a pair of electrode substrates and liquid crystal layer held between the electrode substrates and covering left eye, the first liquid crystal panel being driven by the OCB mode capable of controlling transmissivity of light entering into left eye; a second liquid crystal panel having a pair of electrode substrates and liquid crystal layer held between the electrode substrates and covering right eye, the second liquid crystal panel being driven by the OCB mode capable of controlling transmissivity of light entering into right eye. The driving method of a liquid crystal shutter includes the steps: performing a normal drive to switch the first and second liquid crystal panels between a transmissive state and a non-transmissive state respectively by applying a normal voltage in a pulse shape while the first and second liquid crystal panels are bend alignment state, performing a retention drive to apply a retention voltage in a pulse shape having lower frequency than normal voltage or lower voltage than the normal voltage to the first and second liquid crystal panels to maintain the bend alignment, and switching between the normal drive and the retention drive.

According to other embodiment, an image display system comprises: a liquid crystal shutter including: a first liquid crystal panel having a pair of electrode substrates and liquid crystal layer held between the electrode substrates and covering left eye, the first liquid crystal panel being driven by the OCB mode capable of controlling transmissivity of light entering into left eye; a second liquid crystal panel having a pair of electrode substrates and liquid crystal layer held between the electrode substrates and covering right eye, the second liquid crystal panel being driven by the OCB mode capable of controlling transmissivity of light entering into right eye; and a drive portion to switch a normal drive and a retention drive; wherein the normal drive switches the first and second liquid crystal panels between a transmissive state and a non-transmissive state respectively by applying a normal voltage in a pulse shape while the first and second liquid crystal panels are bend alignment state, and the retention drive applies a retention voltage in a pulse shape having lower frequency than normal voltage or lower voltage than the normal voltage to the first and second liquid crystal panels to maintain the bend alignment, and a display device to display image and transmitting a synchronization signal in synchronism with the image to the liquid crystal shutter; wherein the drive portion performs the normal drive base on the synchronization signal in synchronism with the image displayed by the display device upon receiving the synchronization signal.

Hereinafter, the structure of the image display system with a liquid crystal shutter and a driving method of the liquid crystal shutter are explained referring to drawings in details. First, the structure of the image display system is explained. As shown in FIG. 1, the image display system includes a liquid crystal shutter 1 of an active shutter type, and a liquid crystal display device 2 as a display device.

Figure 2:
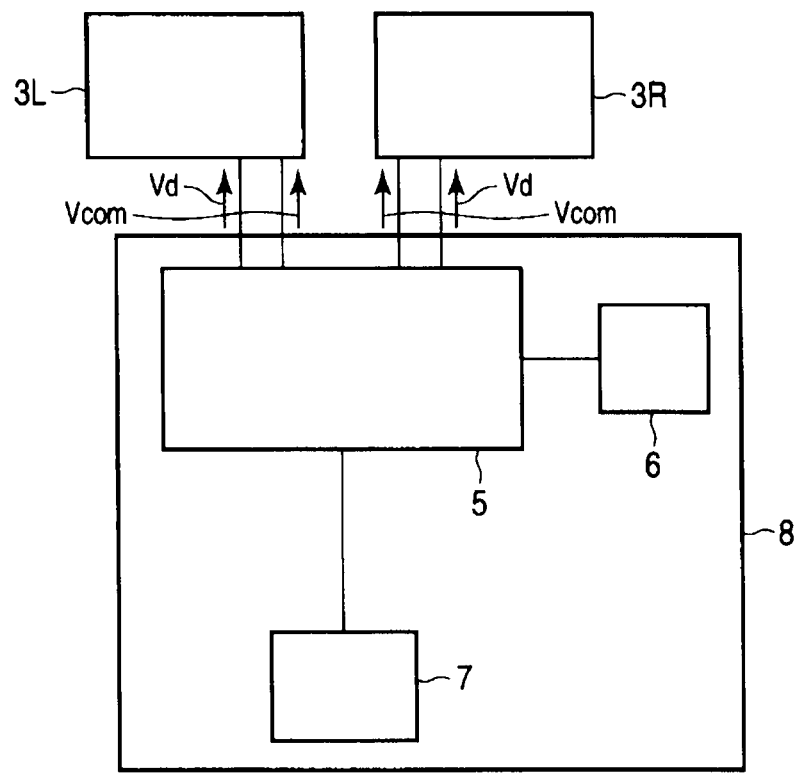
FIG. 2 is a figure schematically showing a liquid crystal shutter shown in FIG. 1.
Figure 3:
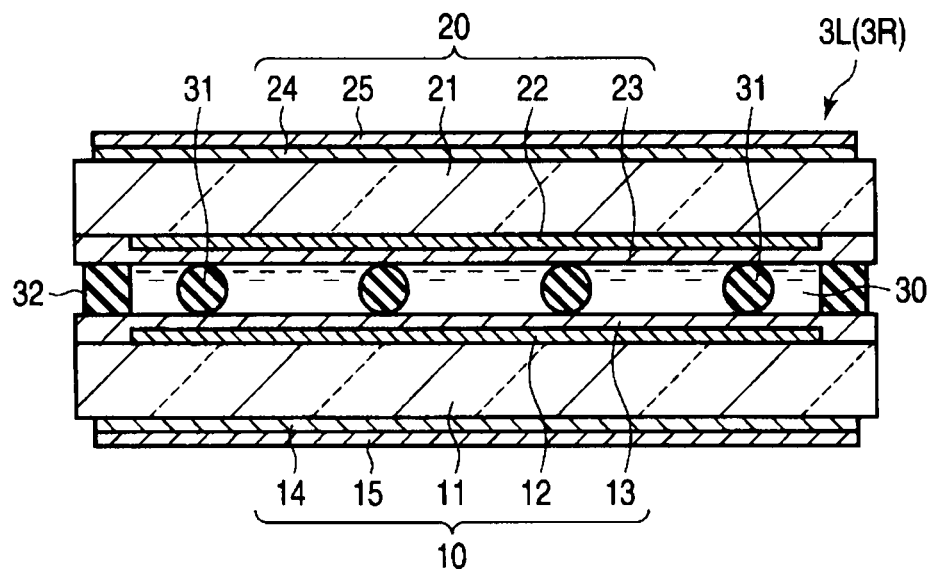
FIG. 3 is a cross-sectional view showing a first liquid crystal panel and a second liquid crystal panel shown in FIG. 1 and FIG. 2.

As shown in FIG. 1 to FIG. 3, the liquid crystal shutter 1 includes a first liquid crystal panel 3L, a second liquid crystal panel 3R, a glasses frame 4, a driving circuit 5, a power supply portion 6, a receiver 7, and a case 8. In this embodiment, the liquid crystal shutter 1 is a glasses wearable type liquid crystal shutter.

The first and second liquid crystal panels 3L and 3R respectively include a liquid crystal layer 30 held between a pair of electrode substrates 10 and 20. The electrode substrate 10 includes a glass substrate 11 as a transparent insulating substrate, a first electrode 12 formed on the glass substrate 11, an alignment film 13 on the glass substrate 11 and the first electrode 12. As the insulating substrate, a plastic substrate or a resin film, etc. are applicable other than the glass substrate. An optical compensation film 14 and a polarizing plate 15 are arranged on the electrode substrate 10. The optical compensation film 14 and the polarizing plate 15 are located in the opposite side of the first electrode 12, and are arranged on an external surface of the glass substrate 11 in order.

The electrode substrate 20 includes a glass substrate 21 as a transparent insulating substrate, a second electrode 22 formed on the glass substrate 21, an alignment film 23 on the glass substrate 21 and the first electrode 22. Similarly, as the insulating substrate, a plastic substrate or a resin film, etc. are applicable other than the glass substrate 21. An optical compensation film 24 and a polarizing plate 25 are arranged on the electrode substrate 20. The optical compensation film 24 and the polarizing plate 25 are located in the opposite side of the second electrode 22, and are arranged on an external surface of the glass substrate 21 in order.

The first electrode 12 and the second electrode 22 are formed of transparent conductive materials, for example, ITO (Indium Tin Oxide). The rubbing treatment is respectively performed to the alignment films 13 and 23 in the same direction. The polarizing plate 15 and the polarizing plate 25 are made in a cross Nichol arrangement so that they cross at approximately 45° to the alignment direction.

The electrode substrate 10 and the electrode substrate 20 are arranged so as to oppose each other with a predetermined gap by a plurality of spherical spacers 31 as spacers, and are attached by a seal material 32. A pillar-shaped spacer can be formed integrally on one of the substrates in place of the spherical spacers 31. The liquid crystal layer 30 is formed with a nematic liquid crystal filled up in a space surrounded by the electrode substrate 10, the electrode substrate 20, and the seal material 32.

As mentioned above, the first liquid crystal panel 3L is formed of a liquid crystal panel of the OCB (optically compensated bend) mode in which π cell is combined with the optical compensation films 14 and 24. Here, the first liquid crystal panel 3L is normally white type in which the panel is in a transmissive state when a voltage is not impressed. The first liquid crystal panel 3L covers eyesight of left eye, and can control the transmissivity of light entering to left eye.

Figure 4:
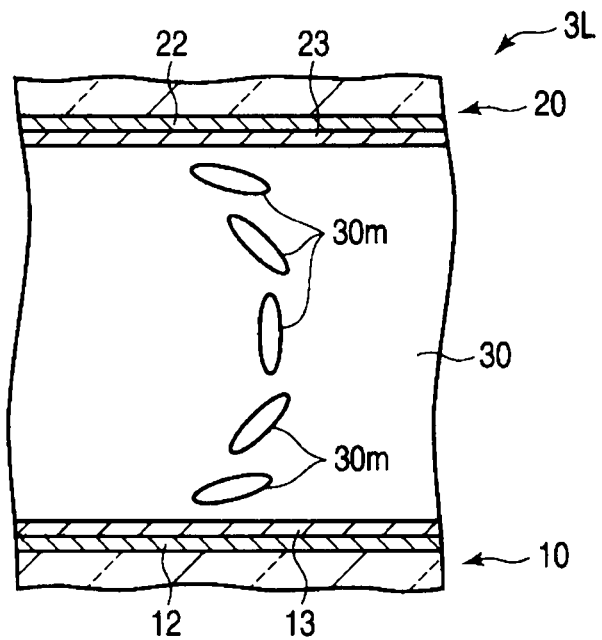
FIG. 4 is a cross-sectional view showing the first and second liquid crystal panels and also is a figure showing an alignment state of liquid crystal molecules when the first and second liquid crystal panels become in a transmissive state.
Figure 5:
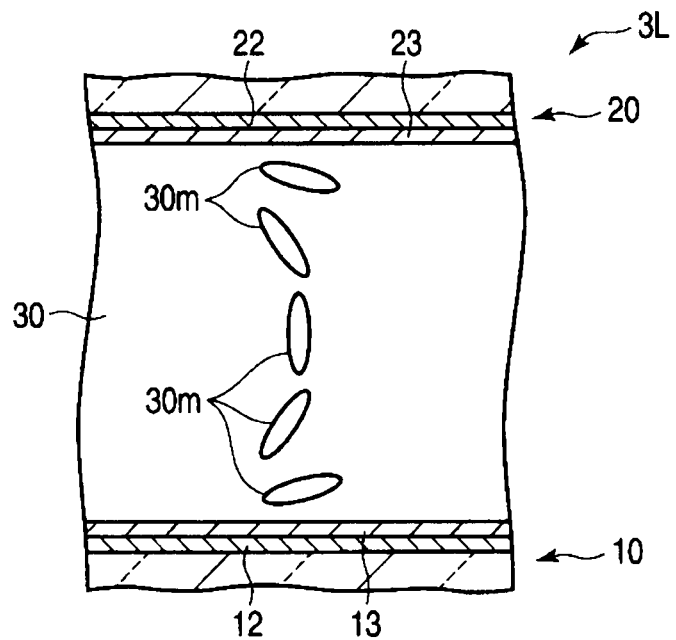
FIG. 5 is a cross-sectional view showing the first and second liquid crystal panels and also is a figure showing an alignment state of the liquid crystal molecules when the first and second liquid crystal panels become in a non-transmissive state.

A driving voltage is impressed to the liquid crystal layer 30 by applying a voltage Vd to the first electrode 12, and a voltage Vcom to the second electrode 22. As shown in FIG. 4 and FIG. 5, the liquid crystal molecules 30m are transitted from a splay alignment state to a bend alignment state by impressing a driving voltage of more than a threshold voltage, for example, 20V to the liquid crystal layer 30 (initial transition). Furthermore, the first liquid crystal panel 3L can be switched between a transmissive state and a non-transmissive state while maintaining the bend alignment state of the liquid crystal molecule 30m by impressing a predetermined driving voltage to the liquid crystal layer 30. The first liquid crystal panel 3L is excellent in high-speed response due to the bend alignment and a flow effect.

As shown in FIG. 1 and FIG. 3, the second liquid crystal panel 3R is formed like the first liquid crystal panel 3L. The second liquid crystal panel 3R includes a pair of electrode substrates 10 and 20 and a liquid crystal layer 30 held between the electrode substrates 10 and 20. The second liquid crystal panels 3R is formed of a liquid crystal panel of the OCB (optically compensated bend) mode and covers the eyesight of right eye, and can control transmissivity of the light entering to the right eye. Here, the second liquid crystal panel 3R is normally white mode type in which the second liquid crystal panel 3R becomes the transmissive state when a voltage is not applied.

In addition, although not illustrated, the positions of electrical terminals may be arranged at different locations mutually in the first liquid crystal panel 3L and the second liquid crystal panel 3R. Thereby, it becomes possible to distinguish which of the first liquid crystal panel 3L and the second liquid crystal panel 3R is for left eye or for right eye. As shown in FIG. 1, the first liquid crystal panel 3L and the second liquid crystal panel 3R are equipped to the glasses frame 4.

The driving circuit 5 is respectively connected to the first and second electrodes of the first liquid crystal panel 3L and the second liquid crystal panel 3R through a flexible printed circuit (FPC) as shown in FIG. 2. The driving circuit 5 switches between two drive operations. One is a normal drive in which the driving circuit 5 applies normal voltages Vd and Vcom respectively to the first liquid crystal panel 3L (liquid crystal layer 30) and the second liquid crystal panel 3R (liquid crystal layer 30), and the other drive operation is a retention drive in which a retention voltage in a pulse shape is applied to the first liquid crystal panel 3L (liquid crystal layer 30) and the second liquid crystal panel 3R (liquid crystal layer 30) so as to maintain the bend alignment state while achieving less consumption than the normal drive.

The driving circuit 5 can switch the transmissive state and the non-transmissive state by turns by performing the normal drive while the liquid crystal molecules 30m of the first liquid crystal panel 3L and the second liquid crystal panel 3R are respectively set to the bend alignment state.

The power supply portion 6 and the receiver 7 are connected to the driving circuit 5. The power supply portion 6 supplies electric power to the driving circuit 5. The receiver 7 receives data (synchronization signal) by a cable or wireless communication. The driving circuit 5 applies the driving voltage to the first liquid crystal panel 3L and the second liquid crystal panel 3R based on the data received with the receiver 7. The case 8 accommodates the driving circuit 5, the power supply portion 6, and the receiver 7, and is equipped to the glasses frame 4. The liquid crystal shutter 1 is formed as mentioned-above.

Figure 6:
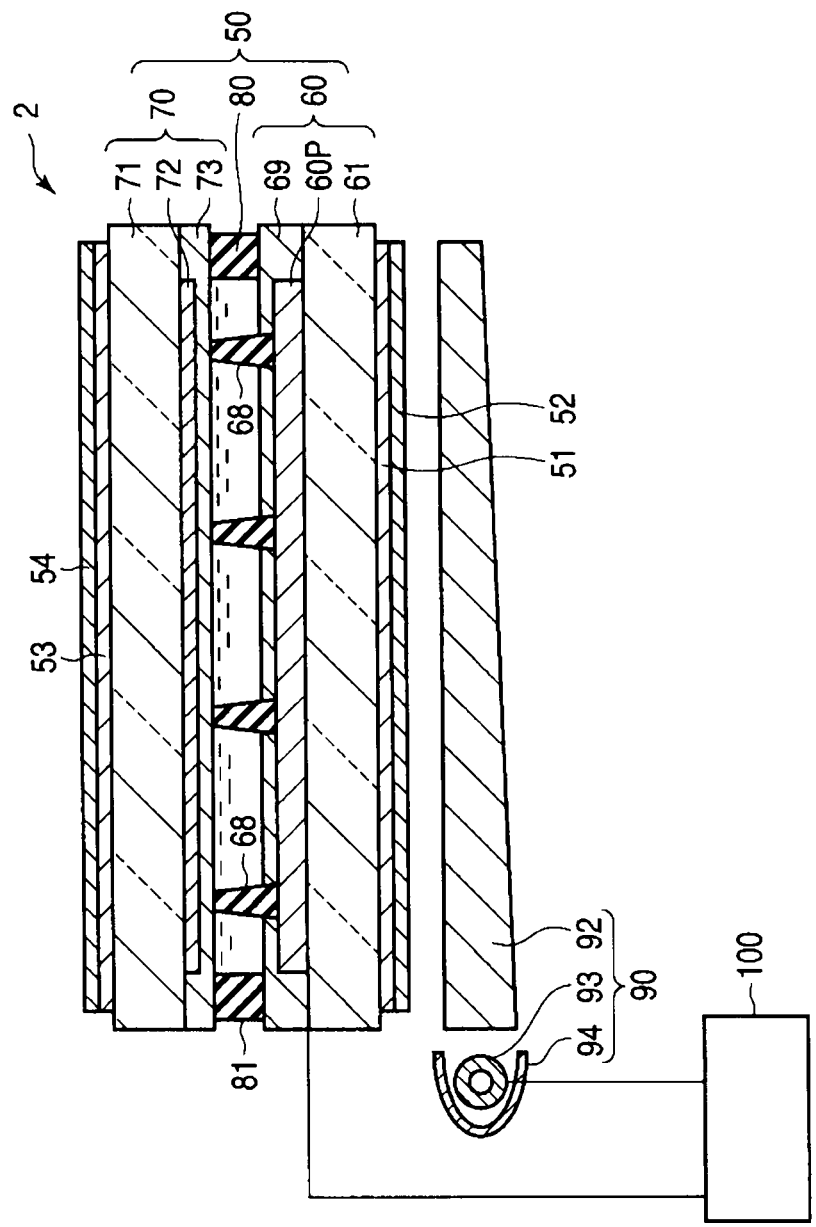
FIG. 6 is a cross-sectional view schematically showing the liquid crystal display device shown in FIG. 1.

As shown in FIG. 1 and FIG. 6, the liquid crystal display device 2 includes a liquid crystal display panel 50, a backlight unit 90, and a control portion 100. The liquid crystal display panel 50 includes an array substrate 60, a counter substrate 70 arranged opposite the array substrate 60 and a liquid crystal layer 80 held between the array substrate 60 and the counter substrate 70.

Figure 7:
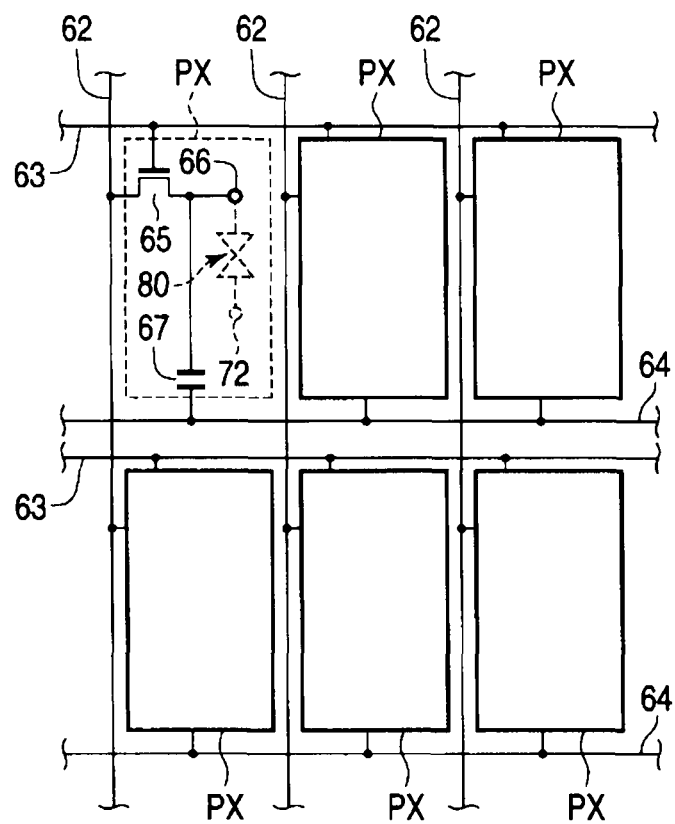
FIG. 7 is a figure showing a portion of an array substrate shown in FIG. 6.

As shown in FIG. 6 and FIG. 7, the array substrate 60 includes a rectangular glass substrate 61 as a transparent insulating substrate. On the glass substrate 61, a plurality of signal lines 62 and a plurality of scanning lines 63 are formed. The signal lines 62 and the scanning lines 63 intersect orthogonally each other. Moreover, a plurality of auxiliary capacitance lines 64 are arranged in parallel with the scanning lines 63 on the glass substrate 61. In this embodiment, a pixel PX is formed in each region surrounded by adjacent two signal lines 62 and adjacent two scanning lines 63. The pixels PX are arranged in the shape of a matrix on the glass substrate 61.

Next, one pixel PX is explained in detail. The pixel PX includes a TFT (thin film transistor) as a switching element 65 formed near intersection of the signal line 62 and the scanning line 63, a pixel electrode 66 connected to the TFT 65, and an auxiliary capacitance element 67 connected to the pixel electrode 66. The auxiliary capacitance line 64 forms one electrode of the auxiliary capacitance element 67.

Although not illustrated, a color filter with three colored layers of red, green and blue is formed on the glass substrate 61. In addition, the above-mentioned pixel electrode 66 is formed on the color filter using transparent electric conductive material, such as ITO. Moreover, for example, a plurality of pillar-shaped spacers 68 are formed as spacers on the color filter. As mentioned-above, an array pattern 60P is formed on the glass substrate 61. An alignment film 69 is formed on the glass substrate 61 and the array pattern 60P.

The counter substrate 70 includes a rectangular glass substrate 71 as a transparent insulating substrate. On the glass substrate 71, a counter electrode 72 and an alignment film 73 are formed in order. In addition, rubbing treatment is performed to the alignment films 69 and 73 in the same direction. Thus, the counter substrate 70 is formed.

The gap between the array substrate 60 and the counter substrate 70 is held by a plurality of pillar-shaped spacers 68. The array substrate 60 and the counter substrate 70 are attached by a seal material 81 arranged along with a perimeter of a display region. The liquid crystal layer 80 is formed by nematic liquid crystal material which fills up a space surrounded by the array substrate 60, the counter substrate 70, and the seal material 81.

On the external surface of the array substrate 60, an optical compensation film 51 and a polarizing plate 52 are formed in order. Similarly, on the external surface of the counter substrate 70, an optical compensation film 53 and a polarizing plate 54 are formed in order. The polarizing plate 52 and the polarizing plate 54 are made in a cross Nichol arrangement so that they cross at approximately 45° to the alignment direction. As mentioned above, the liquid crystal display panel 50 is a OCB mode liquid crystal. Here, the liquid crystal layer 50 is a normally white mode type in which the liquid crystal layer 50 becomes the transmissive state when a voltage is not applied.

As shown in FIG. 6, the backlight unit 90 is formed in the external surface side of the array substrate 60. The backlight unit 90 includes a light guide 92 with a light guide plate opposing to the polarizing plate 52, a light source 93 arranged at one edge side of the light guide 92, for example, formed of a cold cathode fluorescent tube, and a reflector 94.

Next, the above-mentioned liquid crystal shutter 1 and the driving method of the liquid crystal shutter 1 in the image display system are explained. According to this embodiment, in the case of displaying a three-dimensional image using the image display system, when the synchronization signal transmitted to the liquid crystal shutter 1 from the liquid crystal display device 2 is stopped by a certain obstacle, the driving circuit 5 switches the operation from the normal drive to the retention drive.

Figure 8:
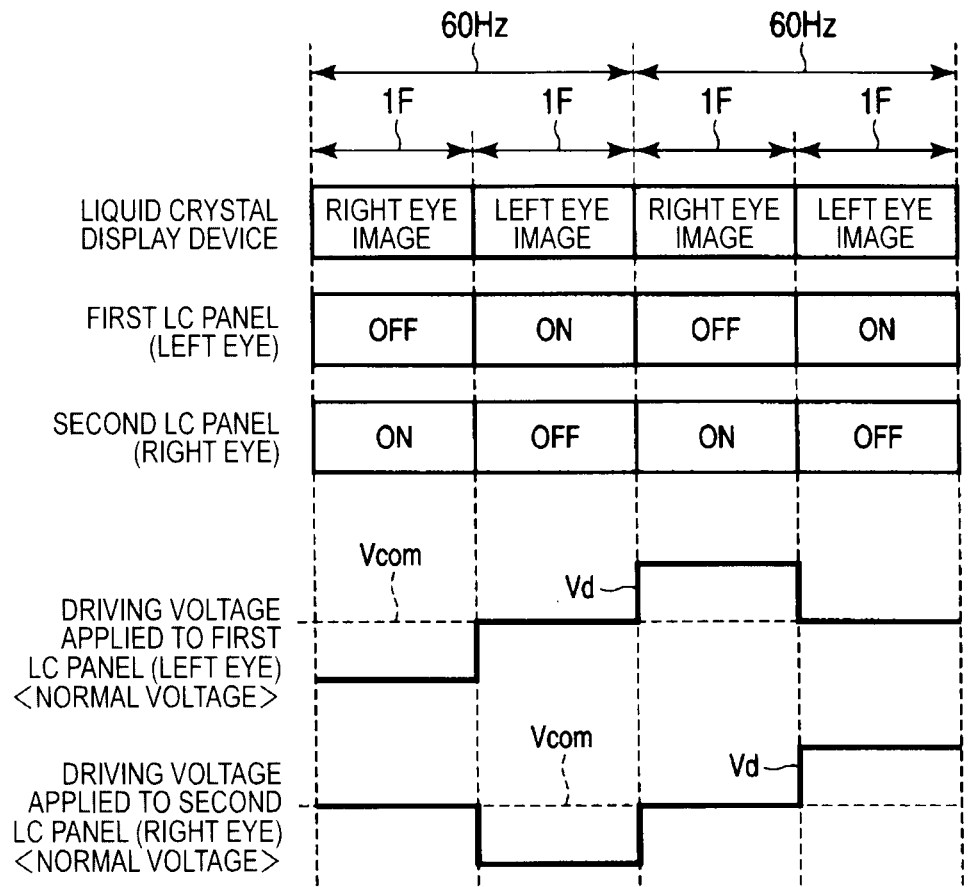
FIG. 8 is a timing chart showing a relation among an image by the display device, ON/OFF timings of the first and second liquid crystal panels used in the image display system, and driving voltages respectively applied to the first and second liquid crystal panels in the image display system.

First, the operation of the liquid crystal shutter 1 and the liquid crystal display device 2, particularly the normal drive by the driving circuit 5 to display the three-dimensional display using the image display system is explained. As shown in FIG. 6 and FIG. 8, the control portion 100 controls the driving of the liquid crystal display panel 50 to display the image for left eye and the image for right eye by turns, for example, in a frame frequency of 120 Hz when displaying the three-dimensional image. Here, one frame (1F) means time during scanning all the pixels PX one by one and till scanning the same pixel PX again.

As apparent from the above explanation, the liquid crystal display device 2 enables the display of the three-dimensional image without the fall of resolution substantially using the frequency of 60 Hz.

The driving circuit 5 applies the normal voltage in a pulse shape to the first liquid crystal panel 3L and the second liquid crystal panel 3R, and performs the normal drive to switch the transmissive state and the non-transmissive state by turns while the liquid crystal molecules 30m of the first liquid crystal panel 3L and the second liquid crystal panel 3R are respectively set to the bend alignment state.

In detail, as shown in FIG. 1, FIG. 2, and FIG. 8, the driving circuit 5 switches the second liquid crystal panel 3R to the transmissive state (ON) during one arbitrary frame period while the first liquid crystal panel 3L is switched to the non-transmissive state (OFF) in synchronism with the displayed image for right eye by the liquid crystal display device 2. Thereby the transmissivity of the first liquid crystal panel 3L is about 0% during this frame period.

During following one frame period, the driving circuit 5 switches the second liquid crystal panel 3R to the non-transmissive state (OFF) while the first liquid crystal panel 3L is switched to the transmissive state (ON) in synchronism with the displayed image for left eye by the liquid crystal display device 2. If the first liquid crystal panel 3L is switched to the transmisissve state (ON), the first liquid crystal panel 3L shows a high-speed response, and the transmissivity of the first liquid crystal panel 3L rises from 0%. Accordingly, the first liquid crystal panel 3L becomes the transmissive state during this frame period.

After that, the first liquid crystal panel 3L and the second liquid crystal panel 3R are switched to the transmissive state by turns in synchronism with the displayed image in the liquid crystal display device 2. When the driving circuit 5 switches the first liquid crystal panel 3L and the second liquid crystal panel 3R to the transmissive state (ON) respectively, the first and second liquid crystal panels 3L and 3R are switched in 1/60 seconds after being switched to the transmissive state (ON) last time. Thereby, the user who wears the liquid crystal shutter 1 can watch the image for left eye and the image for right eye by turns by right and left eyes, and the three-dimensional image is displayed to the user.

Next, the operation of the above-mentioned liquid crystal shutter 1, particularly the retention drive by the driving circuit 5, is explained when the synchronization signal transmitted to the liquid crystal shutter 1 from the liquid crystal display device 2 is stopped by a certain obstacle, in the case of displaying the three-dimensional image using the image drive system. Hereinafter, the retention drive by the driving circuit 5 of the liquid crystal shutter 1 according to the first to fourth embodiments is explained.

The first to fourth embodiments show examples of the retention drive to maintain the bend alignment state of the liquid crystal molecules 30m of the liquid crystal shutter 1. The retention drive according to the embodiments can reduce more power consumption than the normal drive. The retention drive is performed by applying at least one of retention voltages of a pulse shape which have lower frequency than the normal voltage or have relatively lower voltage than the normal voltage to the first liquid crystal panel 3L and the second liquid crystal panel 3R.

(First Embodiment)

First, the liquid crystal shutter 1 and the retention drive (the driving method) of the liquid crystal shutter 1 according to the first embodiment are explained. The retention drive of the liquid crystal shutter 1 is performed by applying the retention voltage whose frequency is lower than the normal voltage to the first liquid crystal panel 3L and the second liquid crystal panel 3R using polarity inversion driving method. The liquid crystal shutter 1 is configured so that the first liquid crystal panel 3L and the second liquid crystal panel 3R are maintained in the transmissive state at any time.

Figure 9:
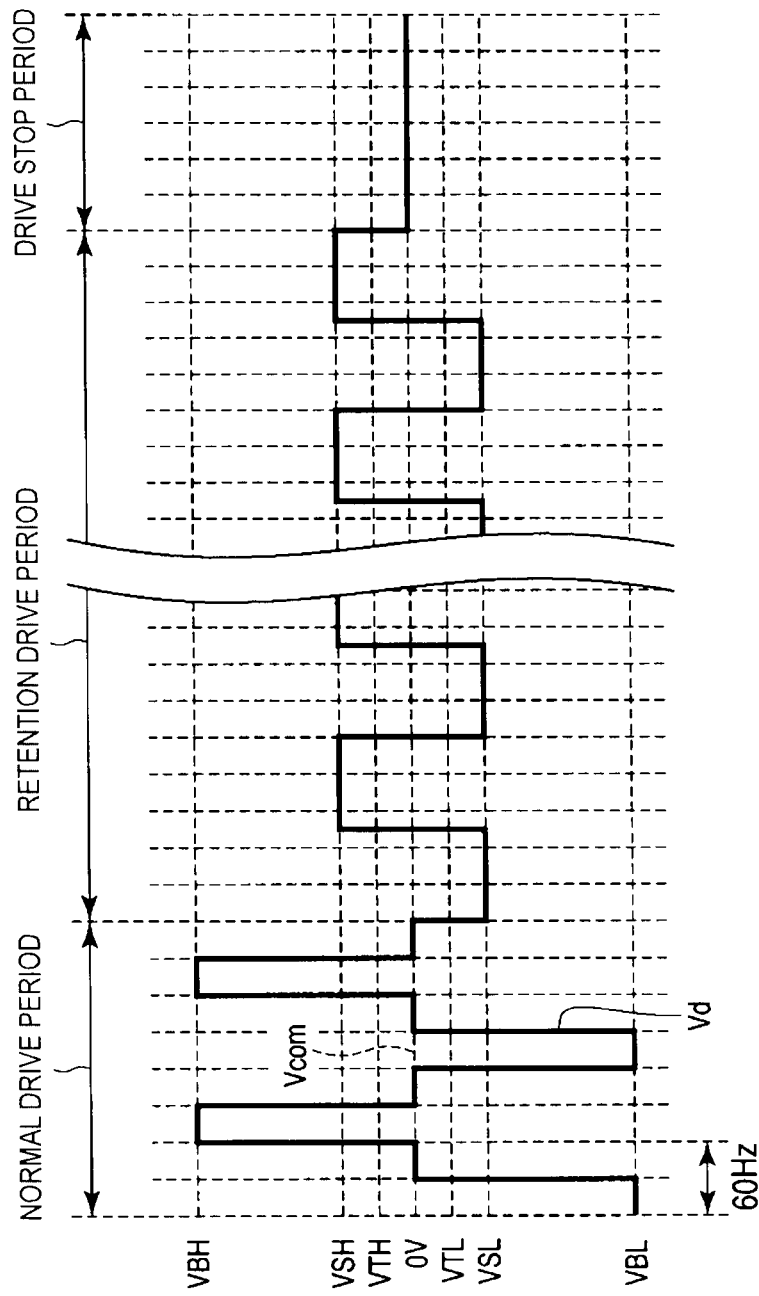
FIG. 9 is a timing chart showing the driving voltage applied to the first liquid crystal panel in the image display system according to a first embodiment.

In detail, as shown in FIG. 2, FIG. 3, and FIG. 9, in the retention drive period changed from the normal drive to the retention drive, the frequency of the retention voltage applied to the first liquid crystal panel 3L is set lower than 120 Hz.

During the retention drive period, the driving circuit 5 performs the polarity-inversion drive which inverts the polarity of the voltage Vd applied to the first liquid crystal panel 3L (the first electrode 12). The driving circuit 5 applies the voltage Vd of a pulse shape in which the voltage VSL and the voltage VSH are changed by turns to the first electrode 12 of the first liquid crystal panel 3L at equal intervals, and applies the voltage Vcom of 0V to the second electrode 22. The second electrode 22 is always set as an earth potential.

The voltage VSL and the voltage VSH are respectively set larger than the critical voltage (threshold voltage value) VTL and VTH in which the liquid crystal molecule 30m reverse-transits to the splay alignment from the bend alignment. In other words, the absolute value of the voltages VSL and the voltage VSH are larger than the absolute value of the critical voltage VTL and VTH.

As for the retention voltage, the voltage level is set relatively smaller than the normal voltage. Here, the voltage VSL is −4V and is set smaller than the voltage VBL of −10V. The voltage VSH is +4V and is set smaller than the voltage VBH of +10V.

The retention voltage during the retention period is adjusted so that the transmissivity of the whole retention drive period (as described below: 15%) is almost same level as the average transmissivity of the normal drive period (as described below: 30%/0%). Here, when the voltage level of the voltage Vd is 0V, the first liquid crystal panel 3L shows the transmissivity of 30%, when the voltage level of the voltage Vd is ±10V (the voltages VBL, VBH), the transmissivity of 0%, and when the voltage level of the voltage Vd is ±4, the transmissivity of 15%. Since the driving circuit 5 carries out the retention drive of the first liquid crystal panel 3L by the above-mentioned voltage setup while maintaining the bend alignment state without a black display (black insertion), it becomes possible to always maintain the first liquid crystal panel 3L in the transmissive state without increase of power consumption.

In addition, during the retention drive period, the driving circuit 5 carries out the retention drive of the second liquid crystal panel 3R like the first liquid crystal panel 3L. The driving circuit 5 can perform the retention drive by self-driving based on an internal clock signal even if the synchronization signal from the liquid crystal display 2 stops.

During the retention drive, since the bend alignment state is maintained when the liquid crystal shutter 1 returns to the state which the synchronization signal from the liquid crystal display 2 can receive by the liquid crystal shutter 1, it is possible to change from the retention drive to the normal drive immediately, and to achieve stabilized operation of the driving circuit 5 by the above configuration.

Moreover, when not returning to the state in which the synchronization signal from the liquid crystal display 2 can be received by the liquid crystal shutter 1 for predetermined interval, for example, 1 minute, it is also possible to configure so that the drive of the first liquid crystal panel 3L and the second liquid crystal panel 3R may be stopped by the driving circuit 5.

In this embodiment, although the voltage Vcom of 0V is always impressed to the second electrode 22, an alternate voltage which alternates in reverse phase to the voltage applied to the first electrode 12 may be used. In this case, there is an advantage that amplitude of the voltage applied to the respective electrodes is made small. Moreover, one of the voltages applied to the electrodes 12 and 22 or voltage applied to both of the electrodes may be controlled. This point is the same as the following embodiments.

(Second Embodiment)

Next, the liquid crystal shutter 1 and the retention drive (the driving method) of the liquid crystal shutter 1 according to the second embodiment are explained. In this embodiment, the retention voltage during the retention period is set as follows. The voltage level of the normal voltage (the voltages VBL, VBH) during the normal drive in which the liquid crystal shutter 1 is in the non-transmissive state is gradually lowered so as not to be lowered beyond the critical voltages VTL and VTH. On the other hand, the voltage level of the normal voltage (the voltage of 0V) during the normal drive in which the liquid crystal shutter 1 is in the transmissive state is gradually raised beyond the critical voltage VTL and VTH. The retention voltage adjusted as described-above, that is, the retention voltage with amplitude larger than the critical voltage VTL and VTH is applied to the first liquid crystal panel 3L and the second liquid crystal panel 3R, respectively. The second embodiment is different from the first embodiment in the point that the retention voltage is gradually changed at the changing time from the normal drive to the retention drive.

Thereby, the transmissivity of the first liquid crystal panel 3L and the second liquid crystal panel 3R during the whole retention drive period can be maintained almost same level as the average transmissivity of the normal drive period of the first liquid crystal panel 3L and the second liquid crystal panel 3R. Thus, user can not check the change from the normal drive to the retention drive visually due to the gradual voltage change.

Figure 10:
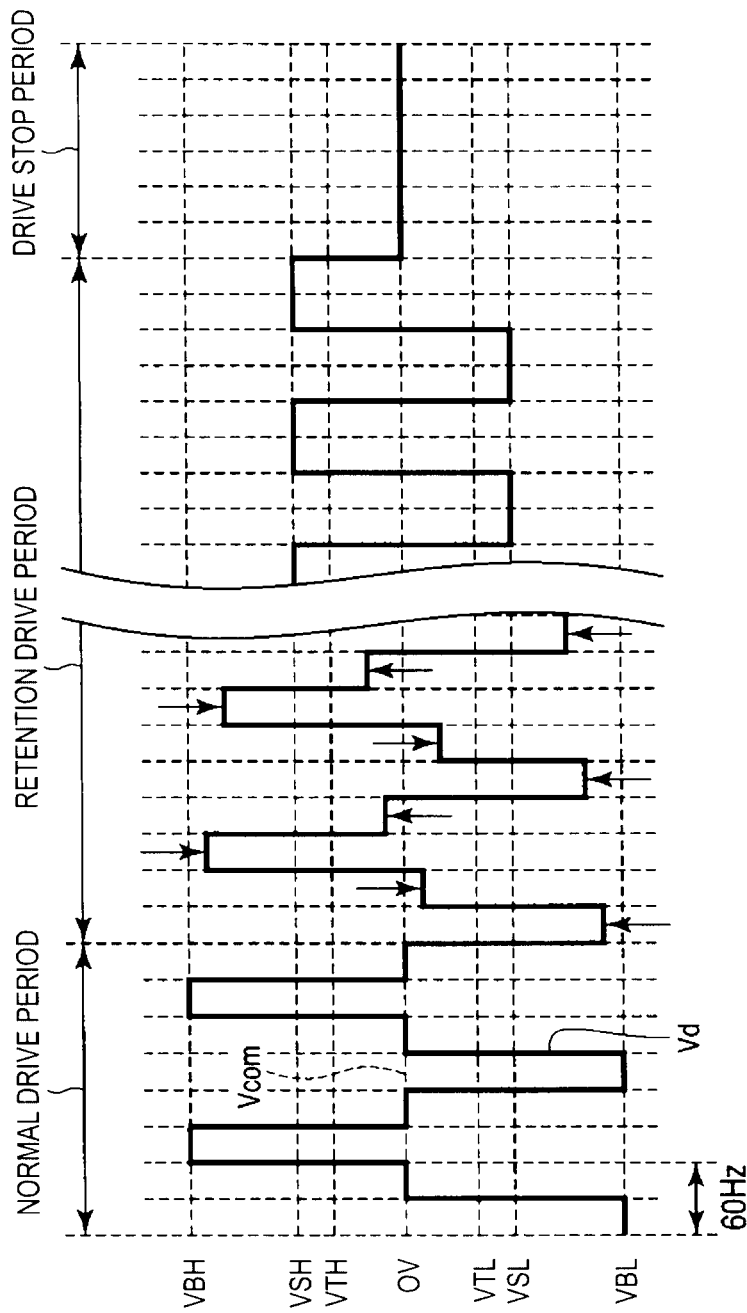
FIG. 10 is a timing chart showing the driving voltage applied to the first liquid crystal panel in the image display system according to a second embodiment.

In detail, in the initial retention drive period in which the normal drive is changed to the retention drive, as shown in FIG. 2, FIG. 3, and FIG. 10, although the frequency of the retention voltage applied to the first liquid crystal panel 3L is 120 Hz at first, the frequency is set lower than 120 Hz after a predetermined period.

During the retention drive period, the driving circuit 5 gradually lowers the voltage level of the voltage Vd applied to the first liquid crystal panel 3L (the first electrode 12) from the voltage VBL so that the voltage may not become smaller than the critical voltage VTL. Moreover, the voltage level of the voltage Vd is gradually lowered from the voltage VBH so that the voltage may not become smaller than the critical voltage VTH. Furthermore, the voltage level of the voltage Vd (0V) is gradually raised so that the voltage may become larger than the critical voltages VTL and VTH. Here, the second electrode 22 is always set to earth potential.

The retention voltage is set relatively smaller than the normal voltages (VBH and VBL). Here, the critical voltage VTL is −5V and the critical voltage VTH is +5V.

Here, the first liquid crystal panel 3L shows the following transmissivity depending on the voltage level of the voltage Vd. For instance, the first liquid crystal panel 3L shows the transmissivity of 30% at 0 V, the transmissivity of 0% at the ±10V (the voltages VBL, VBH), and less than 15% at ±5 V. The driving circuit 5 can always maintain the first liquid crystal panel 3L in the transmissive state without increase of power consumption after a predetermined period since changing to the retention drive without the black-display (black-insertion). In addition, during the retention drive period, the driving circuit 5 carries out the retention drive of the second liquid crystal panel 3R like the first liquid crystal panel 3L.

(Third Embodiment)

Figure 11:
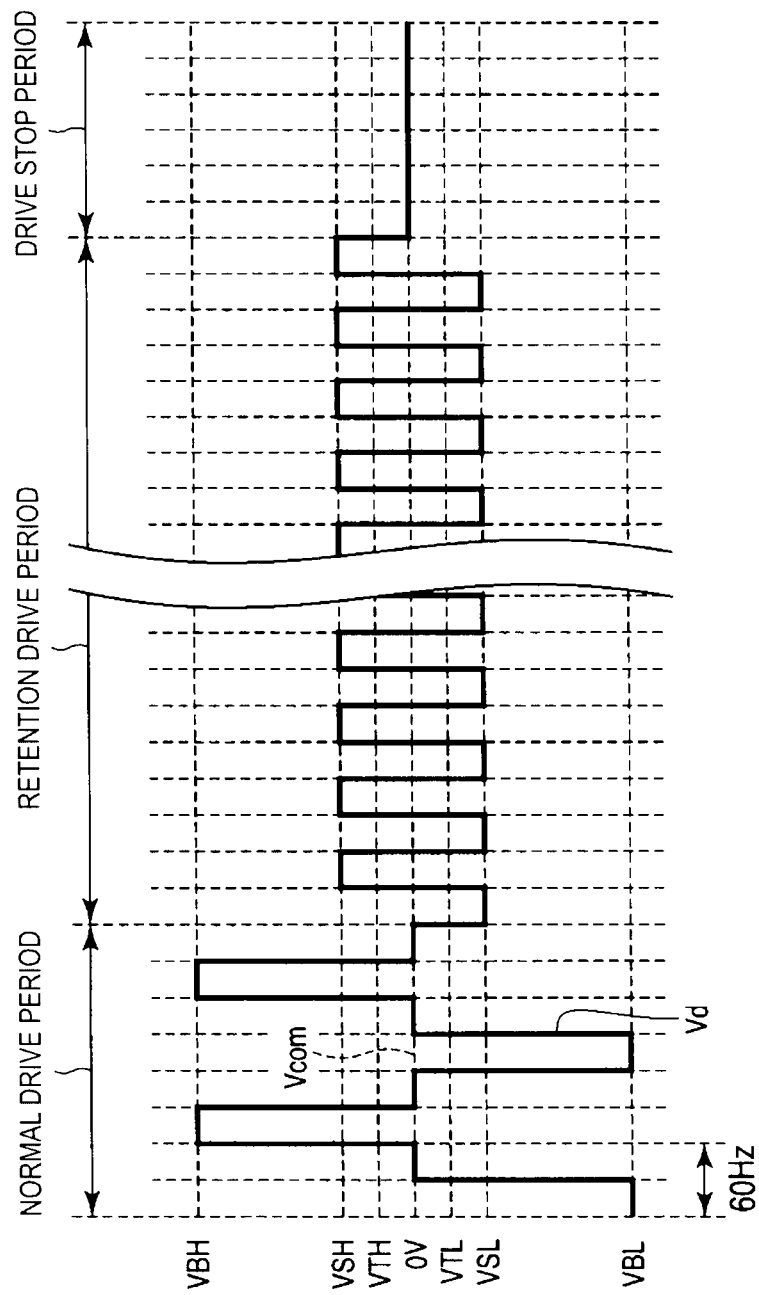
FIG. 11 is a timing chart showing the driving voltage applied to the first liquid crystal panel in the image display system according to a third embodiment.

Next, the liquid crystal shutter 1 and the retention drive (the driving method) of the liquid crystal shutter 1 according to the third embodiment are explained referring to FIG. 11. In this embodiment, the retention voltage with the same frequency as the normal voltage is applied to the first liquid crystal panel 3L and the second liquid crystal panel 3R, respectively while different frequency is used in the first and second embodiments. The first liquid crystal panel 3L and the second liquid crystal panel 3R can always be maintained in the transmissive state during the retention drive period as well as the first and second embodiments.

In detail, as shown in FIG. 2, FIG. 3, and FIG. 11, in the retention drive period changed from the normal drive to the retention drive, the frequency of the retention voltage applied to the first liquid crystal panel 3L is set to 120 Hz.

During the retention drive period, the driving circuit 5 performs the polarity-inversion drive which inverts the polarity of the voltage Vd applied to the first liquid crystal panel 3L (the first electrode 12). The driving circuit 5 applies the voltage Vd of a pulse shape, that is, voltage VSL and the voltage VSH changed by turns, to the first electrode 12 of the first liquid crystal panel 3L at equal intervals, and applies the voltage Vcom of 0V to the second electrode 22. The second electrode 22 is always set as earth potential.

The voltage VSL and the voltage VSH are set larger than the critical voltages (threshold voltage value) VTL and VTH in which the liquid crystal molecule 30m reverse-transits to the splay alignment from the bend alignment. As for the retention voltage, the voltage level is set relatively smaller than the normal voltage (voltages VBL and VBH). Here, the voltage VSL is −4V and is set smaller than the voltage VBL of −10V. The voltage VSH is +4V and is set smaller than the voltage VBH of +10V.

The retention voltage during the retention period is adjusted so that the liquid crystal panel 3L is always in the transmissive state for maintaining almost same level as the average transmissivity of the normal drive period. Here, when the voltage level of the voltage Vd is 0V, the first liquid crystal panel 3L shows the transmissivity of 30%, when the voltage level of the voltage Vd is ±10V (the voltage VBL, VBH), the transmissivity of 0%, and when the voltage level of the voltage Vd is ±4V, the transmissivity of 15%. Since the driving circuit 5 carries out the retention drive of the first liquid crystal panel 3L by the above-mentioned voltage setup while maintaining the bend alignment state without a black display (black insertion), it becomes possible to always maintain the first liquid crystal panel 3L in the transmissive state without increase of power consumption. In addition, during the retention drive period, the driving circuit 5 carries out the second liquid crystal panel 3R like the first liquid crystal panel 3L.

(Fourth Embodiment)

Next, the liquid crystal shutter 1 and the retention drive (the driving method) of the liquid crystal shutter 1 according to the fourth embodiment are explained. In this embodiment, it is assumed the same structure of the third embodiment except that the retention voltage (voltages VSL and VSH) is gradually changed.

Thereby, the transmissivity of the first liquid crystal panel 3L and the second liquid crystal panel 3R during the retention driving period can be gradually raised from the average transmissivity of the normal drive period to maintain the first liquid crystal panel 3L and the second liquid crystal panel 3R in the transmissive state during the retention drive period.

Figure 12:
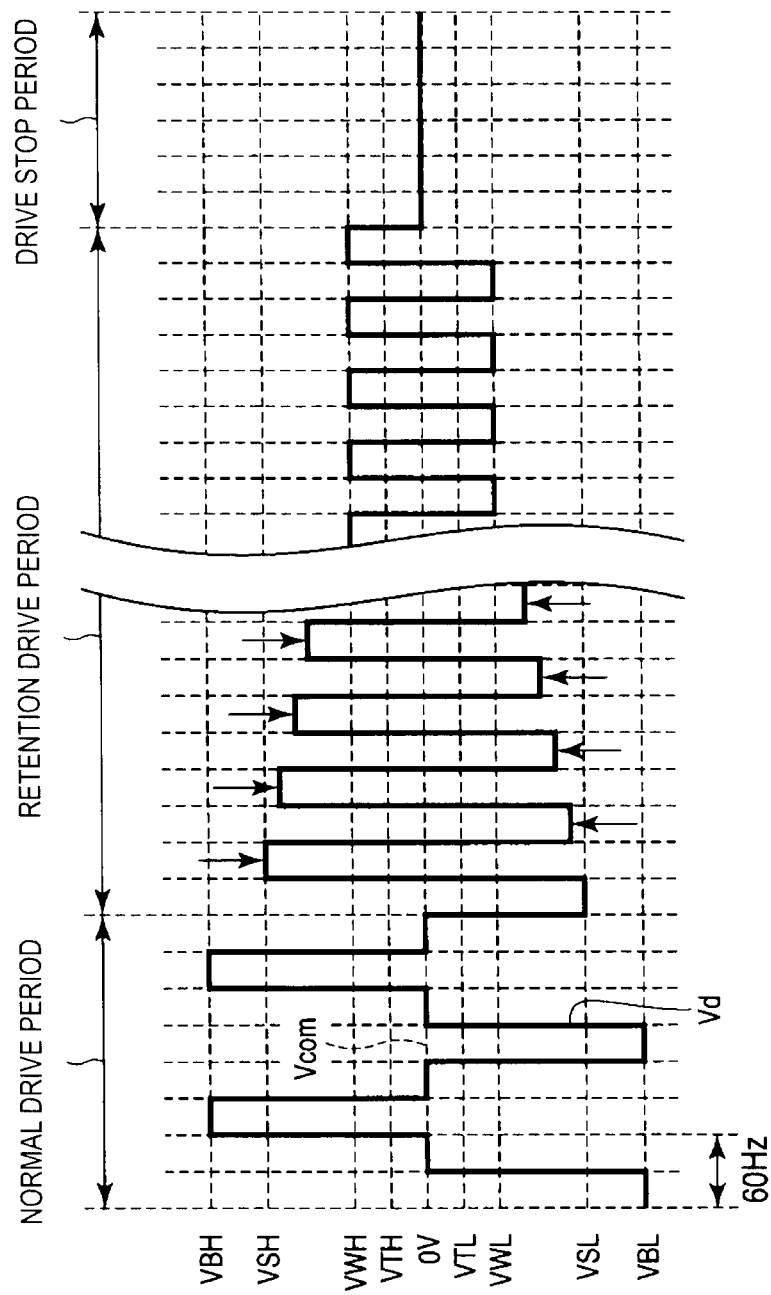
FIG. 12 is a timing chart showing the driving voltage applied to the first liquid crystal panel in the image display system according to a fourth embodiment.

In detail, as shown in FIG. 2, FIG. 3, and FIG. 12, in the retention drive period which is changed from the normal drive to the retention drive, the frequency of the retention voltage applied to the first liquid crystal panel 3L is set to 120 Hz.

During the retention drive period, the driving circuit 5 gradually lowers the voltage Vd applied to the first liquid crystal panel 3L (the first electrode 12) from the voltage VSL to the voltage VWL so that the voltage may not become smaller than the critical voltage VTL. Moreover, the voltage Vd is lowered from the voltage VSH to the voltage VWH so that the voltage may not become smaller than the critical voltage VTH. In addition, the second electrode 22 is always set to earth potential.

The retention voltage is set comparatively lower than the normal voltage. The voltages VWL and VWH are set larger than the critical voltages VTL and VTH in which the liquid crystal molecule 30m reverse-transits to the splay alignment from the bend alignment.

The retention voltage is adjusted so that the transmissivity of the retention drive period may be raised gradually from the average transmissivity of the normal drive period. Here, the first liquid crystal panel 3L shows the transmissivity of 30% when Vd is 0V, the transmissivity of 0% when the voltages VBL, VBH are ±10V, the transmissivity less than 15% when the voltages are VSL and VSH, and further the transmissivity larger than 15% and less than 30% when the voltages are VWL and VWH. The driving circuit 5 can always maintain the first liquid crystal panel 3L in the transmissive state without increase of power consumption after a predetermined period since changing to the retention drive without the black-display (black-insertion). In addition, during the retention drive period, the driving circuit 5 carries out the retention drive of the second liquid crystal panel 3R like the first liquid crystal panel 3L.

Next, a relation between the liquid crystal shutter 1 and the display device 2 in the display system of the above embodiment is explained further. Hereinafter, an explanation is made about the liquid crystal shutter 1 using the polarity-inversion drive in which the polarity of the voltage Vd is inverted every period of the transmissive state (ON) and non-transmissive state (OFF) to reduce the flicker phenomenon as one example. Although the liquid crystal display device 2 can display an image (video image) and a still image, here the case where the liquid crystal display device 2 displays the image (video image) is explained.

As shown in FIG. 1, the liquid crystal display device 2 displays images and simultaneously outputs an identifying signal that shows which image for left eye and for right eye is displayed now. As shown in FIG. 1 and FIG. 2, the receiver 7 of the liquid crystal shutter 1 receives the outputted identifying signal from the liquid crystal display device 2, and transmits the identifying signal to the driving circuit 5. Thereby, the driving circuit 5 can conduct an opening-and-closing operation of the first liquid crystal panel 3L and the second liquid crystal panel 3R in synchronism with the displayed image for left eye and right eye by the liquid crystal display device 2.

Figure 13:
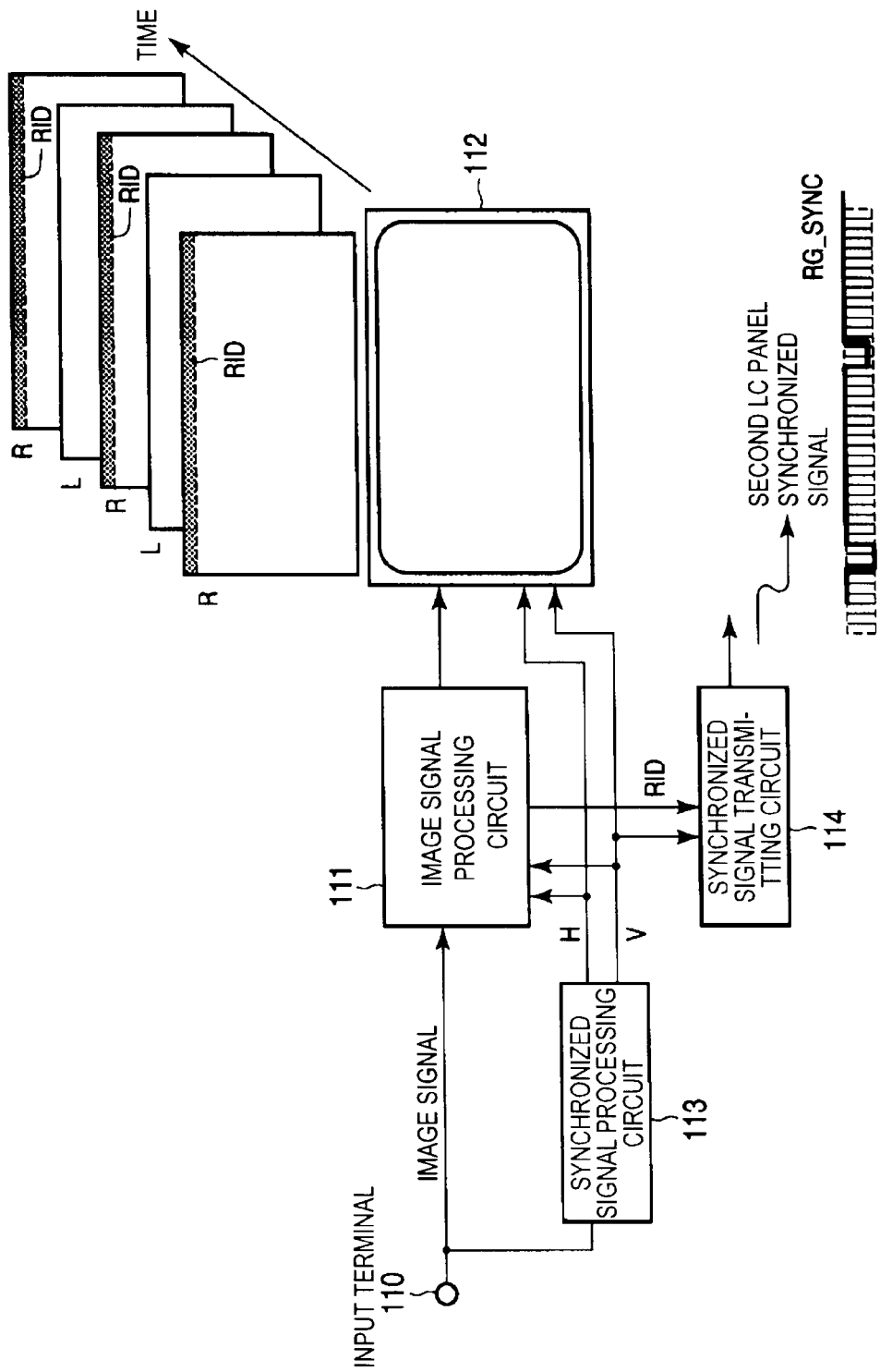
FIG. 13 is a diagram showing a portion of the structure of the display device.

FIG. 13 shows the structure of the liquid crystal display device 2. As shown in FIG. 13, the image signals for left eye and for right eye are inputted to an input terminal 110 of the liquid crystal display device 2. The signals may be any of signals acquired from a broadcast signal and a signal reproduced from a recording medium. Although the image signal for the two-dimensional image display is also inputted to the input terminal 110, the case where the image signal for the three-dimensional display (the image signal for left eye and the image signal for right eye) is inputted is explained hereinafter.

The image signal inputted to the input terminal 110 is transmitted to an image signal processing circuit 111 and a synchronized signal processing circuit 113. The synchronized signal processing circuit 113 separates and outputs a horizontal synchronization signal H and a vertical synchronization signal V from the image signal.

The horizontal synchronization signal H and the vertical synchronization signal V are inputted to the image signal processing circuit 111 and are used as timing pulses for signal processing. Moreover, the horizontal synchronization signal H and the vertical synchronization signal V are inputted to the display portion 112 of the liquid crystal display device 2 and are used as timing pulses for a horizontal scan and a vertical scan. The liquid crystal display device 2 displays the image for left eye based on a signal L and an image for right eye based on a signal R by turns outputted from the image signal processing circuit 111.

Here, an identifying signal RID is inserted in a portion of the image signal R for right eye in the horizontal period which does not usually appear in the display region, for example, immediately after a vertical blanking period. The R identifying signal RID is extracted in the image signal processing circuit 111. The R identifying signal RID is inputted to the synchronized signal transmitting circuit 114. Moreover, above-mentioned vertical synchronization signal V is also inputted to the synchronized signal transmitting circuit 114.

The synchronized signal transmitting circuit 114 generates a second liquid crystal panel synchronized signal RG_SYNC using the vertical synchronization signal V and the R identifying signal RID, and transmits the signal RG_SYNC to the receiver 7. In this embodiment, although the second liquid crystal panel synchronized signal RG_SYNC is transmitted, a first liquid crystal panel synchronized signal, or both of the first and second synchronized signals may be transmitted.

Figure 14:
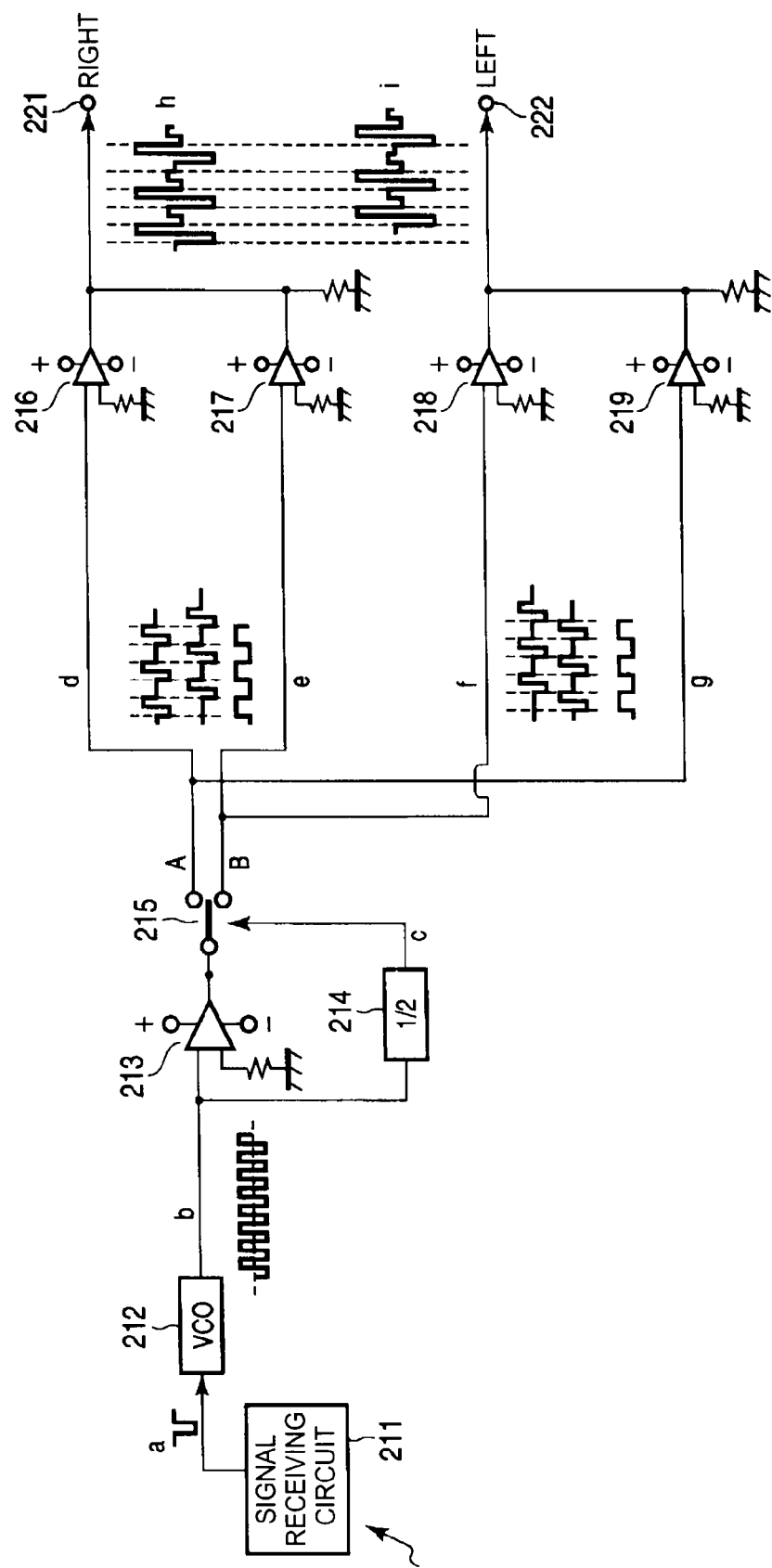
FIG. 14 is a figure schematically showing a receiver of the liquid crystal shutter.
Figure 15:
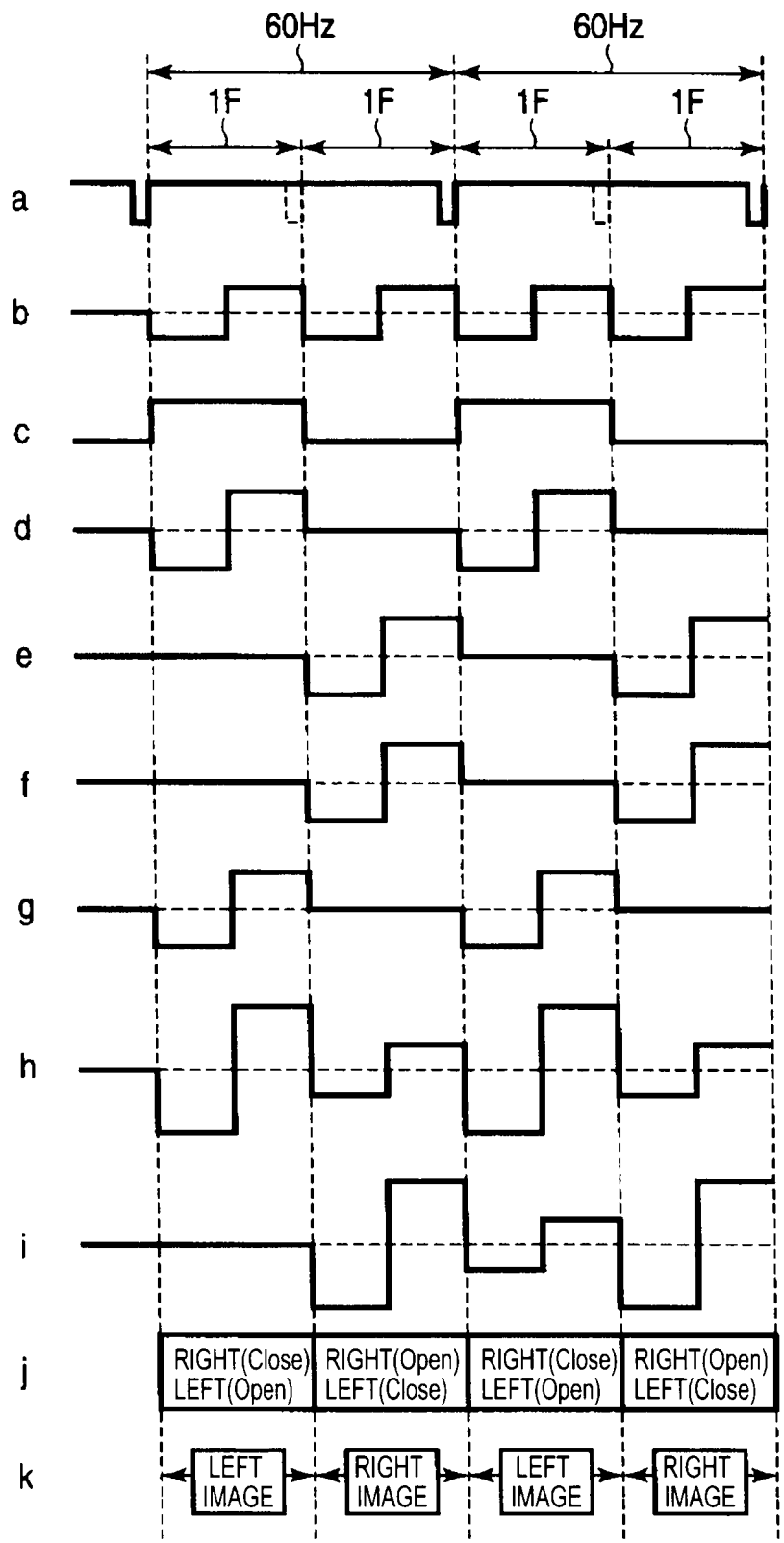
FIG. 15 is a timing chart showing respective signal waveforms of each portion of the receiver, that is, (1) a phase synchronizing signal: "a", (2) a pulse signal: "b", (3) a switch control pulse signal: "c", (4) a signal: "d", (5) a signal: "e", (6) a signal: "f", (7) a signal: "g", (8) a second liquid crystal panel driving signal: "h", (9) a first liquid crystal panel driving signal: "i", (10) an opening-closing sequence of the first and second liquid crystal panels: "j", and (11) a sequence of the image displayed on the liquid crystal display device: "k".

FIG. 14 shows the receiver 7 of the liquid crystal shutter 1. Moreover, FIG. 15 shows signal waveforms at each portion of the receiver 7. As shown in FIG. 14 and FIG. 15, a signal receiving circuit 211 demodulates the second liquid crystal panel synchronized signal RG_SYNC. The second liquid crystal panel synchronized signal RG_SYNC is inputted to a voltage controlled oscillator 212 as a phase synchronized signal "a". The voltage controlled oscillator 212 contains a phase lock loop and a divider circuit, and generates and outputs a pulse signal "b" synchronized with the second liquid crystal panel synchronized signal RG_SYNC. The pulse signal "b" is changed from a low level to a high level for every one-frame period. The pulse signal "b" is inputted to an amplifier 213 and is transformed to a positive and negative symmetrical waveform with respect to the reference voltage and is inputted to a switch 215. Moreover, the pulse signal "b" is inputted to a ½ divider 214, and the ½ divider 214 outputs a switch control pulse signal "c".

When the switch control pulse "c" is positive, the switch 215 is connected to a terminal A, and when the switch control pulse "c" is negative, the switch 215 is connected to a terminal B. The terminal A is connected to the amplifiers 216 and 219, and the terminal B is connected to the amplifiers 217 and 218. The amplifier 216 amplifies the signal "d" from the terminal A, and the amplifier 217 amplifies the signal "e" from the terminal B. The signals amplified with the amplifiers 216 and 217 are synthesized and are outputted to the output terminal 221 as a second liquid crystal panel driving signal "h" (voltage Vd). Here, the amplification rate of the amplifier 216 is set smaller than that of the amplifier 217.

On the other hand, the amplifier 219 amplifies the signal "g" (=d) from the terminal A, and the amplifier 218 amplifies the signal "f" (=e) from the terminal B. The signals amplified with the amplifier 219 and the amplifier 218 are synthesized and are outputted to an output terminal 222 as a first liquid crystal panel driving signal "i" (voltage Vd). Here, the amplification rate of the amplifier 218 is set smaller than that of the amplifier 219.

The second liquid crystal panel 3R and the first liquid crystal panel 3L are respectively driven by the above-mentioned second liquid crystal panel driving signal "h" and the first liquid crystal panel driving signal "i". In FIG. 15, "j" shows an opening-and-closing sequence of the first liquid crystal panel 3L (for left eye) and the second liquid crystal panel 3R (for right eye). Moreover, "k" shows a sequence of the images for left eye and for right eye displayed on the liquid crystal display device 2.

According to the image display system with the liquid crystal shutter 1 configured as above and the driving method of the liquid crystal shutter 1, the image display system includes the glasses wearing type liquid crystal shutter 1 and the liquid crystal display device 2 which displays the image for left eye (video image) and the image for right eye (video image) by turns. The liquid crystal shutter 1 includes the first liquid crystal panel 3L in the OCB mode for left eye, the second liquid crystal panel 3R in the OCB mode for right eye, and the driving circuit 5.

The driving circuit 5 performs the normal drive by applying normal voltages in the pulse shape to the first liquid crystal panel 3L and the second liquid crystal panel 3R respectively, and switches the first liquid crystal panel 3L and the second liquid crystal panel 3R to the transmissive state (ON) or the non-transmissive state (OFF) by turns, respectively while the liquid crystal molecules of the first liquid crystal panel 3L and the second liquid crystal panel 3R are in the bend alignment state.

The liquid crystal display device 2 displays the image for left eye (video image) and the image for right eye (video image) in the frequency of 120 Hz by turns, and the first liquid crystal panel 3L and the second liquid crystal panel 3R are switched to the transmissive state (ON) or the non-transmissive state (OFF) by turns in the frequency of 120 Hz. Accordingly, a clear three-dimensional image as well as the case where the image is displayed in the frequency of substantially 60 Hz is achieved for the user who wears the liquid crystal shutter 1.

The driving circuit 5 applies the retention voltage of the pulse shape in which the frequency is lower than the normal voltage or the voltage level is lower than the normal voltage to the first liquid crystal panel 3L and the second liquid crystal panel 3R. Thereby, the driving circuit 5 can perform the retention drive to maintain the bend alignment state of the liquid crystal molecules 30m by changing from the normal drive.

In the first and second embodiments, the retention voltage has the characteristic that the frequency is smaller than the normal voltage. In the first to fourth embodiments, the retention voltage has the characteristic that the voltage level is relatively lower than the normal voltage. For this reason, the liquid crystal shutter 1 (driving circuit 5) according to the first to fourth embodiments can perform the retention drive to maintain the bend alignment of the liquid crystal molecule 30m with lower power consumption than the normal drive.

In the first to third embodiments, since the retention voltage is adjusted so that the transmissivity during the whole retention drive period may become almost the same as the average transmissivity of the normal drive period, the driving circuit 5 can change from the normal drive to the retention drive without giving the user equipped with the liquid crystal shutter 1 sense of discomfort.

In the fourth embodiment, the retention voltage is also adjusted so that the transmissivity of the retention drive period may be gradually raised from the average transmissivity of the normal drive period. Since the field of view of the user equipped with the liquid crystal shutter 1 does neither become bright nor dark suddenly, the driving circuit 5 can change the normal drive to the retention drive while suppressing the sense of discomfort given to the user equipped with the liquid crystal shutter 1.

As described-above, according to the embodiments, it is possible to provide the liquid crystal shutter 1, the driving method of the liquid crystal shutter 1, and the image display system capable of reducing power consumption and securing stabilized operation.

For example, the frequency of the retention voltage is preferably within 10 Hz to 0.01 Hz. The retention drive to maintain the bend alignment of the liquid crystal molecules can be performed using the retention voltage having above frequency with lower power consumption than the normal drive.

During the normal drive period, the slew rate of the driving electric power at the time of switching the first liquid crystal panel 3L and the second liquid crystal panel 3R to the transmissive state or the non-transmissine state may be lowered respectively, that is, rising and falling characteristics of the voltage Vd may be made worsened. In detail, the slew rate of the driving electric power may be set to sufficiently low value within a range in which the charging operation is completed faster than the response time of the liquid crystal (faster one of the ON/OFF operations of the first and second liquid crystal panels 3L and 3R). Thereby, since peak current falls, low power consumption can be attained.

However, when the slew rate is made low, the switching time from the transmissive state to the non-transmissive state is delayed. In the case, what is necessary is to set the duty to small value by the reduced portion of the slew rate, and to set early the timing to switch the transmissivity of the first liquid crystal panel 3L and the second liquid crystal panel 3R (timing to switch from the transmissive state to the non-transmissive state in this example).

When a user removes the liquid crystal shutter 1, the above-mentioned liquid crystal shutter 1 and the driving method of the liquid crystal shutter 1 may be configured so that the driving 5 may change from the normal drive to the retention drive. In this case, the retention drive can be performed without taking into consideration the transmissivity of the first liquid crystal panel 3L and the second liquid crystal panel 3R. In addition, it is easily detectable whether the user removed the liquid crystal shutter 1 or not, if a sensor is provided in the glasses frame 4.

During the retention drive, when the user wears again the liquid crystal shutter 1, the driving circuit 5 may change from the retention drive to the normal drive. Moreover, when the user does not wear the liquid crystal shutter 1 during a specific time, the driving circuit 5 may stop the drive of the first liquid crystal panel 3L and the second liquid crystal panel 3R.

The value of the above-mentioned voltage Vd and voltage Vcom are not limited to the above-mentioned examples, and can be changed variously. That is, the value of the voltage Vd and voltage Vcom should be adjusted so as to fit to the design of the first liquid crystal panel 3L and the second liquid crystal panel 3R.

In the above embodiments, the liquid crystal display device 2 displays the image for left eye (video image) and the image for right eye (video image) by turns in the frequency of 120 Hz, and the first liquid crystal panel 3L and the second liquid crystal panel 3R are switched to the transmissive state (ON) or the non-transmissive state (OFF) by turns in the frequency of 120 Hz. However, such frequency is not limited to 120 Hz.

Although the first liquid crystal panel 3L and the second liquid crystal panel 3R use a normally white mode type, they may be a normally black mode type in which the light is shut out in the state where voltage is not applied by adjusting the design.

Although the driving circuit 5 is accommodated in the case 8, the accommodation method is not limited to this, and can be changed variously. For example, a portion or whole of the driving circuit 5 may be provided in the first liquid crystal panel 3L and the second liquid crystal panel 3R.

The liquid crystal shutter 1 is not limited to the glasses wearing type liquid crystal shutter, and can be changed variously. That is, the liquid crystal shutter may be equipped to components other than the glasses frame 4.

The above-mentioned display device may not be limited to the liquid crystal display device 2, and can be changed variously. That is, the display devices may be PDP (Plasma Display Panel) display device or a CRT (cathode-ray tube) display device.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope and spirit of the inventions.

What is claimed is:

1. A liquid crystal shutter, comprising:
   a first liquid crystal panel having a pair of electrode substrates and a liquid crystal layer held between the electrode substrates and covering a left eye, the first liquid crystal panel being driven by the OCB mode capable of controlling transmissivity of light entering into the left eye;
   a second liquid crystal panel having a pair of electrode substrates and a liquid crystal layer held between the electrode substrates and covering a right eye, the second liquid crystal panel being driven by the OCB mode capable of controlling transmissivity of light entering into the right eye; and
   a drive portion to switch a normal drive and a retention drive of the first and second liquid crystal panels;
   wherein the normal drive switches the first and second liquid crystal panels between a transmissive state and a non-transmissive state respectively by applying a normal voltage in a pulse shape while the first and second liquid crystal panels are set in a bend alignment state, and
   the retention drive applies a retention voltage in a pulse shape having lower frequency than the normal voltage or lower voltage than the normal voltage to the first and second liquid crystal panels to maintain bend alignment,
   the retention voltage is made lower than the normal voltage to set the non-transmissive state of the first and second liquid crystal panels and higher than a critical threshold voltage in which the liquid crystal layer reverse-transits from the bend alignment state to a splay alignment state, and
   the retention voltage is formed in a pulse shape by gradually lowering the normal voltage to set the non-transmissive state so as not to be lower than the critical threshold voltage, and by gradually raising the normal voltage to set the transmissive state beyond the critical threshold voltage at a timing of changing from the normal drive to the retention drive.

2. The liquid crystal shutter according to claim 1, wherein the drive portion maintains the first and second liquid crystal panels in the transmissive state respectively by the retention drive.

3. The liquid crystal shutter according to claim 1, wherein the drive portion applies the retention voltage so that a transmissivity of the first and second liquid crystal panels in the whole retention drive period is almost the same as the average transmissivity of the first and second liquid crystal panels in the normal drive period.

4. The liquid crystal shutter according to claim 1, wherein the drive portion performs the retention drive using a polarity-inversion drive, and maintains the first and second liquid crystal panels in the transmissive state respectively during the whole retention period.

5. The liquid crystal shutter according to claim 1, wherein the first and second liquid crystal panels are normally white mode type, respectively.

6. The liquid crystal shutter according to claim 1, further comprising a glasses frame, wherein the first and second liquid crystal panels are equipped to the glasses frame.

7. A liquid crystal shutter, comprising:
a first liquid crystal panel having a pair of electrode substrates and a liquid crystal layer held between the electrode substrates and covering a left eye, the first liquid crystal panel being driven by the OCB mode capable of controlling transmissivity of light entering into the left eye;
a second liquid crystal panel having a pair of electrode substrates and a liquid crystal layer held between the electrode substrates and covering a right eye, the second liquid crystal panel being driven by the OCB mode capable of controlling transmissivity of light entering into the right eye; and
a drive portion to switch a normal drive and a retention drive of the first and second liquid crystal panels;
wherein the normal drive switches the first and second liquid crystal panels between a transmissive state and a non-transmissive state respectively by applying a normal voltage in a pulse shape while the first and second liquid crystal panels are set in a bend alignment state,
the retention drive applies a retention voltage in a pulse shape having lower frequency than the normal voltage or lower voltage than the normal voltage to the first and second liquid crystal panels to maintain bend alignment,
the retention voltage is made lower than the normal voltage to set the non-transmissive state and higher than a critical threshold voltage in which the liquid crystal layer reverse-transits from the bend alignment state to a splay alignment state, and
the retention voltage is formed in a pulse shape by lowering gradually the normal voltage to set the non-transmissive state so as not to be lower than the critical threshold voltage at a timing of changing from the normal drive to the retention drive.

8. A liquid crystal shutter, comprising:
a liquid crystal panel having a pair of electrode substrates and a liquid crystal layer held between the electrode substrates, the liquid crystal panel being driven by the OCB mode; and
a drive portion to switch a normal drive and a retention drive of the liquid crystal panel;
wherein the normal drive switches the liquid crystal panel between a transmissive state and a non-transmissive state respectively by applying a normal voltage in a pulse shape while the liquid crystal panel is set in a bend alignment state, and
the retention drive applies a retention voltage in a pulse shape having lower frequency than the normal voltage or lower voltage than the normal voltage to the liquid crystal panel to maintain the bend alignment,
the retention voltage is made lower than the normal voltage to set the non-transmissive state of the liquid crystal panel and higher than a critical threshold voltage in which the liquid crystal layer reverse-transits from the bend alignment state to a splay alignment state, and
the retention voltage is formed in a pulse shape by gradually lowering the normal voltage to set the non-transmissive state so as not to be lower than the critical threshold voltage, and by gradually raising the normal voltage to set the transmissive state beyond the critical threshold voltage at a timing of changing from the normal drive to the retention drive or from the retention drive to the normal drive.

9. The liquid crystal shutter according to claim 8, wherein the drive portion performs the retention drive using a polarity-inversion drive, and maintains the liquid crystal panel in the transmissive state during the whole retention period.

10. A driving method of a liquid crystal shutter including,
a first liquid crystal panel having a pair of electrode substrates and a liquid crystal layer held between the electrode substrates and covering a left eye, the first liquid crystal panel being driven by the OCB mode capable of controlling transmissivity of light entering into the left eye; and
a second liquid crystal panel having a pair of electrode substrates and a liquid crystal layer held between the electrode substrates and covering a right eye, the second liquid crystal panel being driven by the OCB mode capable of controlling transmissivity of light entering into the right eye; and
the driving method of the liquid crystal shutter comprising:
performing a normal drive to switch the first and second liquid crystal panels between a transmissive state and a non-transmissive state respectively by applying a normal voltage in a pulse shape while the first and second liquid crystal panels are in a bend alignment state,
performing a retention drive to apply a retention voltage in a pulse shape having lower frequency than normal voltage or lower voltage than the normal voltage to the first and second liquid crystal panels to maintain the bend alignment,
forming the retention voltage lower than the normal voltage to set the non-transmissive state of the first and second liquid crystal panels and higher than a critical threshold voltage in which the liquid crystal layer reverse-transits from the bend alignment state to a splay alignment state, and switching between the normal drive and the retention drive, and
switching between the normal drive and the retention drive, wherein the retention voltage is formed in a pulse shape by gradually lowering the normal voltage to set the non-transmissive state so as not to be lower than the critical threshold voltage, and by gradually raising the normal voltage to set the transmissive state beyond the critical threshold voltage.

11. The driving method of a liquid crystal shutter according to claim 10, wherein the first and second liquid crystal panels are respectively maintained in the transmissive state by the retention drive.

12. The driving method of a liquid crystal shutter according to claim 11, wherein the retention voltage is formed so that a transmissivity of the first and second liquid crystal panels in the whole retention drive period is almost the same as the average transmissivity of the first and second liquid crystal panels in the normal drive period.

13. The driving method of a liquid crystal shutter according to claim 10, wherein the retention drive is made using a polarity-inversion drive method, and maintains the first and second liquid crystal panels in the transmissive state during the whole retention drive period.

14. The driving method of a liquid crystal shutter according to claim 10, wherein the first and second liquid crystal panels are normally white mode type, respectively.

15. A driving method of a liquid crystal shutter including:
a first liquid crystal panel having a pair of electrode substrates and a liquid crystal layer held between the electrode substrates and covering a left eye, the first liquid crystal panel being driven by the OCB mode capable of controlling transmissivity of light entering into the left eye; and
a second liquid crystal panel having a pair of electrode substrates and a liquid crystal layer held between the electrode substrates and covering a right eye, the second liquid crystal panel being driven by the OCB mode capable of controlling transmissivity of light entering into the right eye; and the driving method of the liquid crystal shutter comprising:

performing a normal drive to switch the first and second liquid crystal panels between a transmissive state and a non-transmissive state respectively by applying a normal voltage in a pulse shape while the first and second liquid crystal panels are in a bend alignment state, performing a retention drive to apply a retention voltage in a pulse shape having lower frequency than normal voltage or lower voltage than the normal voltage to the first and second liquid crystal panels to maintain the bend alignment, forming the retention voltage lower than the normal voltage to set the non-transmissive state of the first and second liquid crystal panels and higher than critical threshold voltage in which the liquid crystal layer reverse-transits from the bend alignment state to a splay alignment state; and switching between the normal drive and the retention drive, wherein the retention voltage is formed in a pulse shape by lowering gradually the normal voltage to set the non-transmissive state so as not to be lower than the critical threshold voltage.

16. An image display system comprising:

a liquid crystal shutter including;

a first liquid crystal panel having a pair of electrode substrates and a liquid crystal layer held between the electrode substrates and covering a left eye, the first liquid crystal panel being driven by the OCB mode capable of controlling transmissivity of light entering into the left eye, a second liquid crystal panel having a pair of electrode substrates and a liquid crystal layer held between the electrode substrates and covering a right eye, the second liquid crystal panel being driven by the OCB mode capable of controlling transmissivity of light entering into the right eye, and a drive portion to switch a normal drive and a retention drive;

wherein the normal drive switches the first and second liquid crystal panels between a transmissive state and a non-transmissive state respectively by applying a normal voltage in a pulse shape while the first and second liquid crystal panels are in a bend alignment state, the retention drive applies a retention voltage in a pulse shape having lower frequency than normal voltage or lower voltage than the normal voltage to the first and second liquid crystal panels to maintain the bend alignment, and the retention voltage is formed in a pulse shape by gradually lowering the normal voltage to set the non-transmissive state so as not to be lower than the critical threshold voltage, and by gradually raising the normal voltage to set transmissive state beyond the critical threshold voltage at timing of changing from the normal drive to the retention drive or the retention drive to the normal drive, a display device to display image and to transmit a synchronization signal in synchronism with the image to the liquid crystal shutter;

wherein the drive portion performs the normal drive based on the synchronization signal in synchronism with the image displayed by the display device upon receiving the synchronization signal.

* * * * *